(12) United States Patent
Castillo

(10) Patent No.: US 8,523,271 B2
(45) Date of Patent: Sep. 3, 2013

(54) VEHICLE WITH COMPOSITE STRUCTURAL BED

(75) Inventor: Brian V. Castillo, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 296 days.

(21) Appl. No.: 13/024,431

(22) Filed: Feb. 10, 2011

(65) Prior Publication Data

US 2012/0205942 A1     Aug. 16, 2012

(51) Int. Cl.
*B60J 7/00*     (2006.01)
(52) U.S. Cl.
USPC ...................................................... 296/184.1
(58) Field of Classification Search
USPC ............... 296/184.1, 190.01, 190.03, 190.08, 296/193.07, 181.3, 187.08, 183.1, 204, 203.04, 296/193.08
See application file for complete search history.

(56) References Cited

U.S. PATENT DOCUMENTS

| 6,247,747 B1 * | 6/2001 | Kawanomoto et al. ........ 296/191 |
| 6,843,525 B2 * | 1/2005 | Preisler ..................... 296/193.07 |
| 8,251,424 B2 * | 8/2012 | Parfut et al. ................ 296/24.43 |

\* cited by examiner

*Primary Examiner* — Joseph Pape
(74) *Attorney, Agent, or Firm* — Quinn Law Group, PLLC

(57) ABSTRACT

A vehicle having a structural bed configured to serve as a structural load-bearing member is provided. The structural bed extends rearward from a cab structure of the vehicle and includes a core layer. First and second outer layers flank the core layer and span substantially the entirety of the core layer. The first and second outer layers are composed of a material that has a higher strength than the core layer. The thickness of the core layer may be at least approximately 10 times greater than each of the thicknesses of the first and second outer layers, respectively. The composite structural bed may be integrated with mass-efficient structures to produce an efficient load-bearing structure for a vehicle.

17 Claims, 3 Drawing Sheets

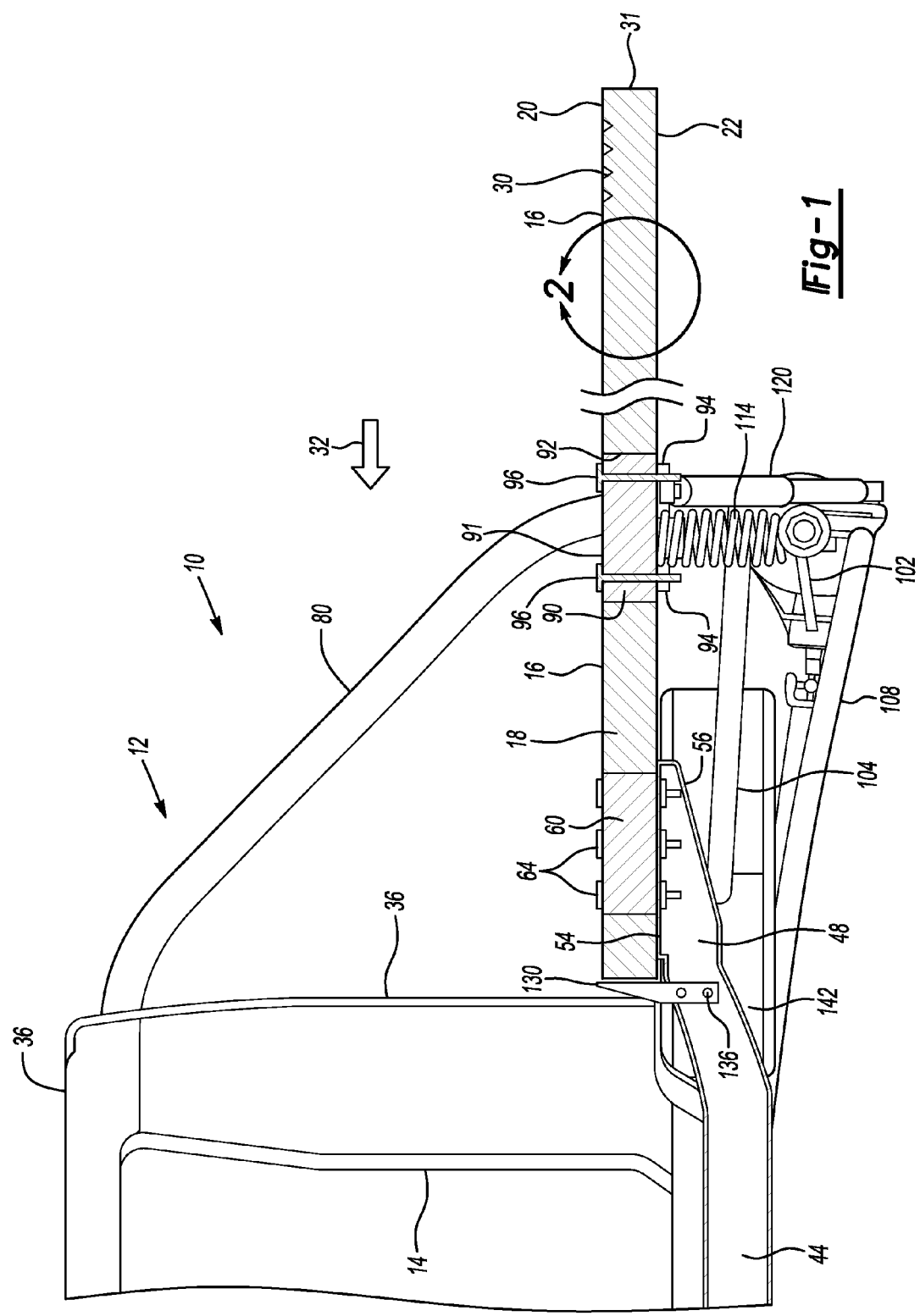

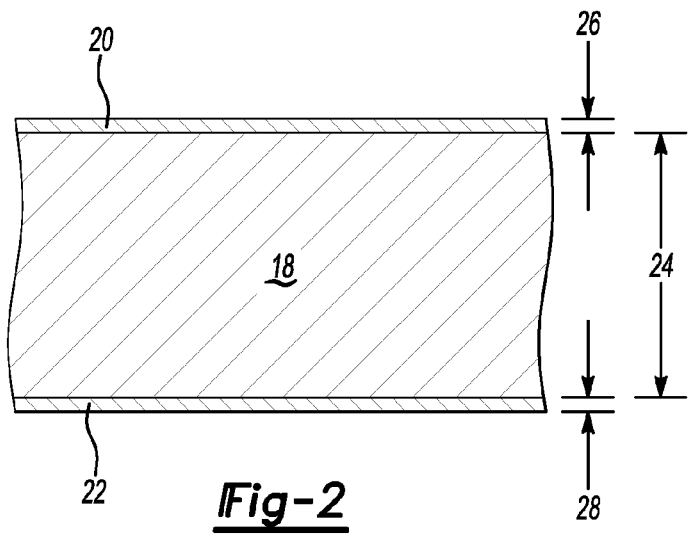
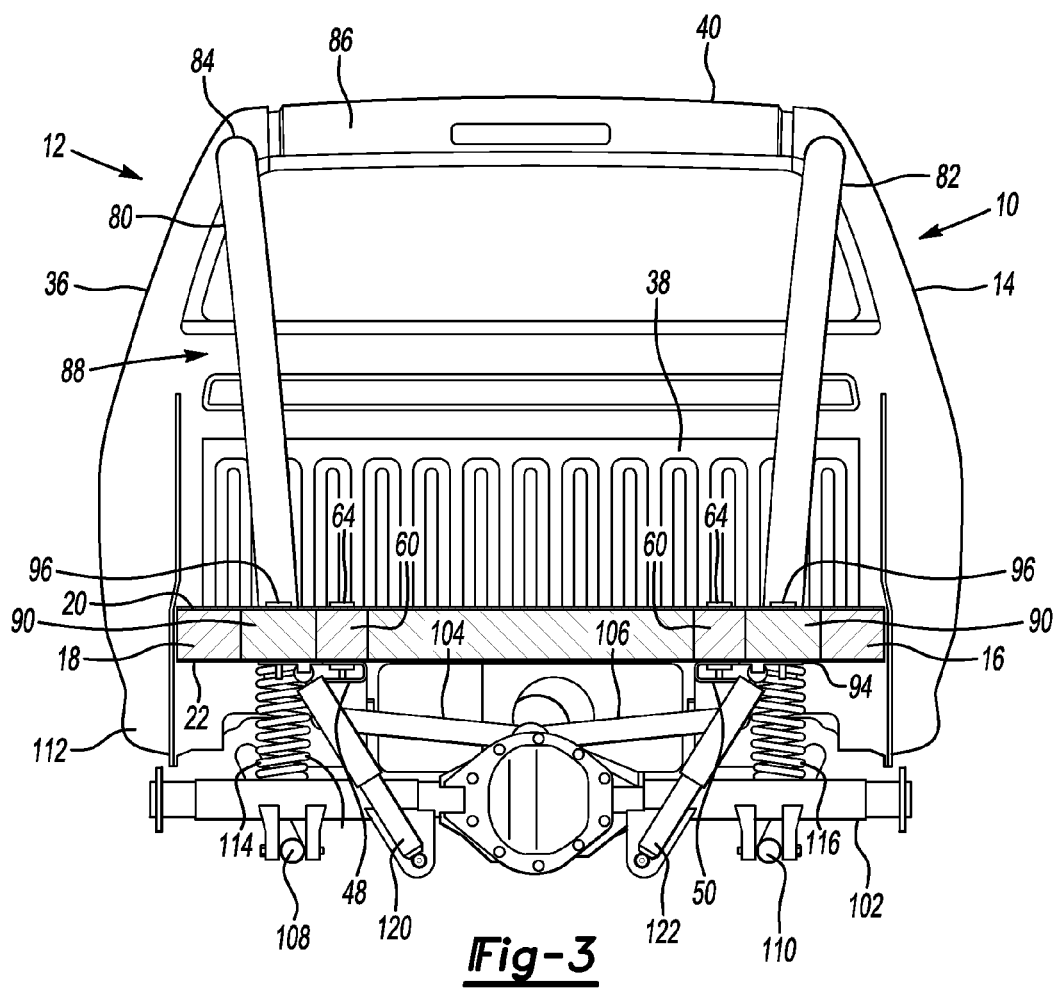

VEHICLE WITH COMPOSITE STRUCTURAL BED

TECHNICAL FIELD

The invention relates generally to a vehicle body structure and more specifically, to a vehicle having a cab and a bed.

BACKGROUND OF THE INVENTION

There are two types of vehicle construction generally used today: body-over-frame construction, which uses a separate steel frame to which the body is bolted at various points; and unibody construction or body-frame-integral, in which the body sections serve as structural members. Pickup-type vehicles are typically built with body-over-frame construction as the flexibility to do multiple body styles is very limited in a body-frame-integral truck. However, body-over-frame construction truck designs are typically mass intensive.

SUMMARY OF THE INVENTION

A vehicle having a structural bed configured to serve as a structural load-bearing member is provided. The structural bed extends rearward from a cab structure of the vehicle and includes a core layer. First and second outer layers flank the core layer and span substantially the entirety of the core layer. The first and second outer layers are composed of a material that has a higher strength than the core layer. The core layer may be composed of a foam material, while the first and second outer layers may be composed of metal or fiberglass composites. The thickness of the core layer may be at least approximately 10 times greater than each of the thicknesses of the first and second outer layers, respectively. Grooves may be formed in the core layer of the structural bed and configured to allow the core layer to crush in a predetermined manner upon a rear impact event.

By employing a composite structural bed composed of first and second outer layers over a core layer, the bed floor and separate frame rails on a traditional pickup structure are replaced. The structural bed also maintains modularity of the bed with respect to the cab structure, saves mass and adds stiffness and strength. Providing a structural bed floor enables the flexibility of body-over-frame construction while allowing the mass-saving opportunity that is compatible with unibody construction. The design enables a pickup-type vehicle to be built in an assembly plant that is configured for unibody construction, such as a car plant. The composite structural bed may be integrated with other mass-efficient structures to produce an efficient load-bearing structure for a vehicle. The vehicle may include spaced-apart first and second buttresses extending rearward from the cab structure and operatively connected to the structural bed. The vehicle may include spaced-apart longitudinally-extending first and second rail extensions to operatively connect the structural bed to respective first and second underbody rails that extend at least partially along the cab structure.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic fragmentary partly cross-sectional side view of a vehicle;

FIG. 2 is a schematic fragmentary close-up cross-sectional view of the portion 2 shown in FIG. 1;

FIG. 3 is a schematic fragmentary partly cross-sectional rear view of the vehicle body of FIG. 1;

DESCRIPTION OF THE PREFERRED EMBODIMENTS

Figure 4:
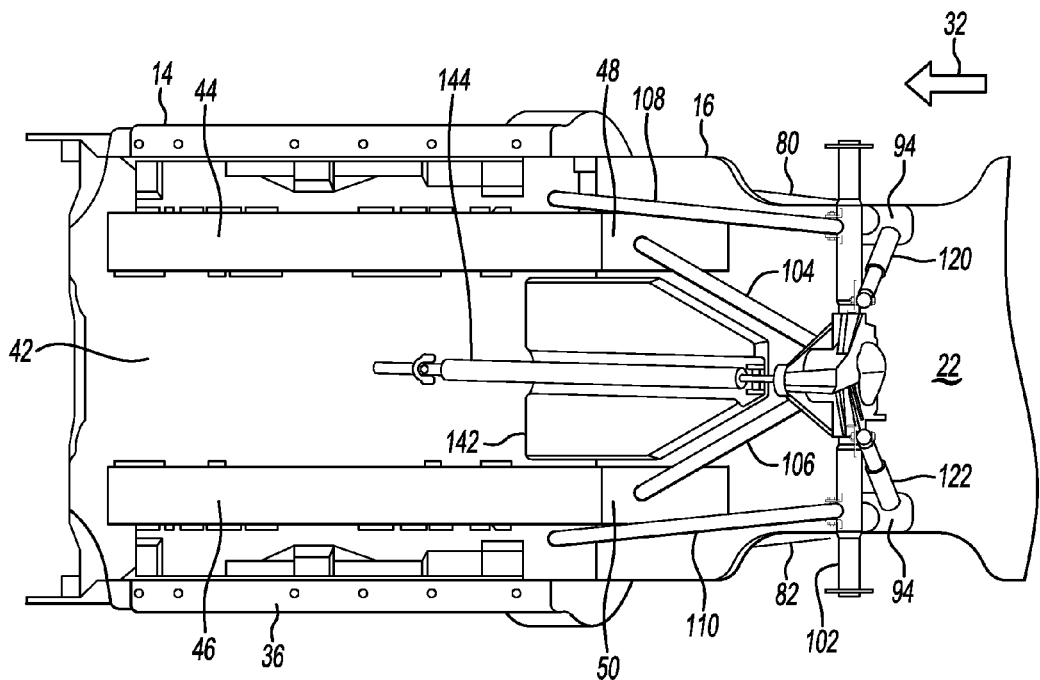
FIG. 4 is a schematic fragmentary bottom view of the vehicle of FIG. 1.

Referring to the drawings, wherein like reference numbers refer to like components throughout the several views, FIG. 1 shows a vehicle 10. In this embodiment, the vehicle 10 is represented generally by a vehicle body 12 that is of a pickup-type. However, a variety of other types of vehicles may be used within the scope of the disclosure, including sport utility vehicles and trucks. The body 12 includes a passenger compartment or cab structure 14 and a composite structural bed 16. Schematic fragmentary side, rear and bottom views of the vehicle body 12 are shown in FIGS. 1, 3 and 4, respectively.

Referring to FIGS. 1-2, the structural bed 16 includes a core layer 18. Flanking the core layer 18 are first and second outer layers 20, 22 that span substantially the entirety of the core layer 18. Optionally, adhesive may be used to bond the core layer 18 to the first and second outer layers 20, 22. The core layer 18 functions as a transverse shear-bearing member while the first and second outer layers 20, 22 function as tension/compression-bearing members. Referring to FIG. 2, the core layer 18 may have a thickness 24 that is greater than the thicknesses 26, 28 of the first and second outer layers 20, 22, respectively. The thickness 24 of the core layer 18 may be at least approximately 10 times greater than each of the thicknesses 26, 28 of the outer layers 20, 22. The outer layers 20, 22 may have approximately the same thickness. In one example, the core layer 18 has a thickness of approximately 120 mm while the first and second outer layers 20, 22 each have a thickness of approximately 1 mm.

The outer layers 20, 22 are composed of a material that has a higher strength than the material comprising the core layer 18. Optionally, the strength of each of the outer layers 20, 22 is at least approximately 10 times the strength of the core layer 18. The outer layers 20, 22 may be formed of metals such as steel, aluminum; fiberglass composites such as carbon-fiber reinforced polymers, epoxy composites; or any other suitable materials. Optionally, the outer layers 20, 22 may be composed of metal having strength between 275 and 375 Mpa and stiffness between 100 and 200 Gpa. Optionally, the outer layers 20, 22 may be composed of composites or polymers having strength between 1500 and 2500 Mpa and stiffness between 50 and 150 Gpa. The core layer 18 may be composed of any suitable material that is lightweight and stiff, such as foam. Optionally, the core layer 18 may be composed of urethane foam having strength between 10 and 20 Mpa and stiffness between 0.5 and 1.0 Gpa.

As shown in FIG. 1, voids or grooves 30 may be formed in the core layer 18 adjacent to the first outer layer 20. The grooves 30 may be positioned towards the rear end 31 of the vehicle 10. The grooves 30 allow the first outer layer 20 to buckle in compression in a predictable way upon a forward load of a rear impact event, indicated by arrow 32 and shown in FIGS. 1 and 4-5. The first outer layer 20 buckles first causing the entire structural bed 16, including the core layer 18, to crush predictably. The buckling will initiate at the weakest point; by creating an intentionally weak spot at the grooves 30, the buckling is predictable. The size of the grooves 30 may be tuned by one of ordinary skill in the art for the specific application.

Referring to FIG. 3, the cab structure 14 includes a side-frame 36 (one is also shown in FIG. 1), rear wall 38, roof 40, and floor pan 42 (shown in FIG. 4). The floor pan 42 is a structural member in the construction of the cab structure 14. Referring to FIG. 4, spaced first and second underbody rails 44, 46 extend longitudinally along the length of the cab structure 14. The first and second underbody rails 44, 46 are welded or otherwise rigidly attached to the floor pan 42. The first and second underbody rails 44, 46 are composed of a structural, load-bearing material, such as structural steel.

Figure 5:
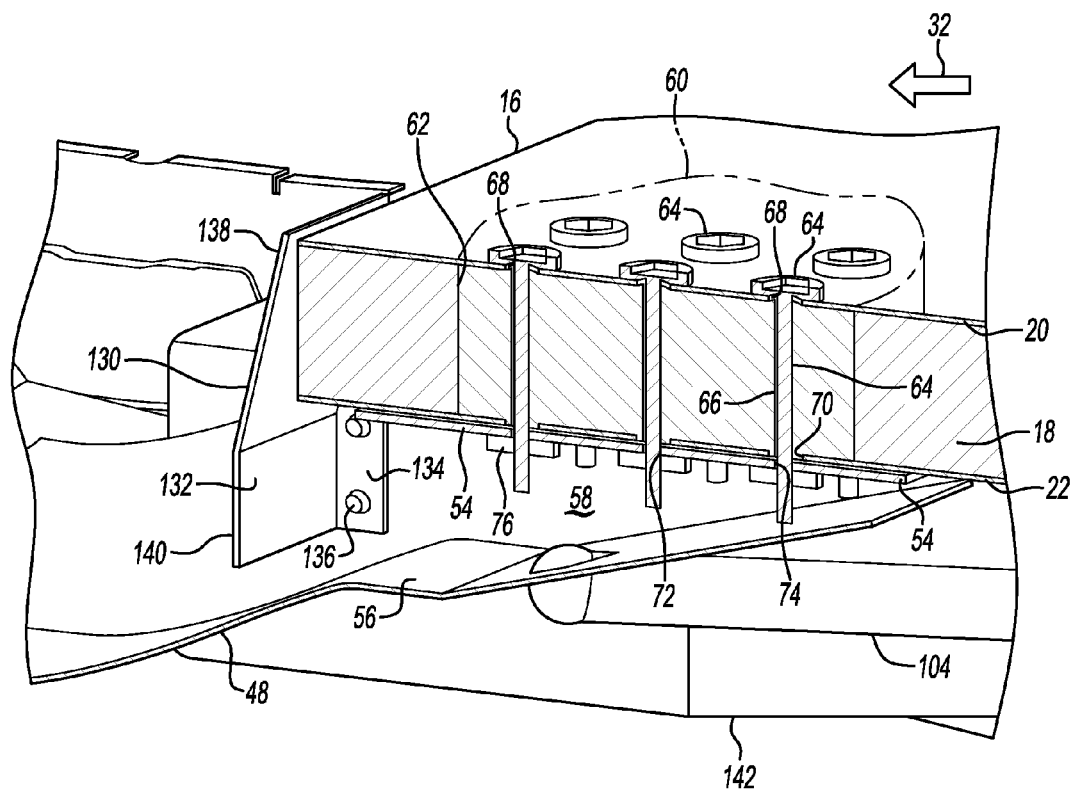
FIG. 5 is a schematic fragmentary perspective cross-sectional view of a portion of the vehicle shown in FIG. 1.

As illustrated in FIG. 4, the first and second underbody rails 44, 46 are operatively connected to the structural bed 16 via first and second rail extensions 48, 50 (the first rail extension 48 is also shown in FIGS. 1, 3 and 5). The rail extensions 48, 50 extend rearward of the cab structure 14 to provide an attachment point for the structural bed 16. Referring to FIG. 5, the first rail extension 48 includes a first plate 54, a second plate 56 spaced-apart from the first plate 54 and opposing side walls 58 that connect the first plate 54 and second plate 56. The rail extensions 48, 50 extend in a direction substantially parallel to a forward travel direction (shown by arrow 32) of the vehicle 10.

As illustrated in FIG. 5, the structural bed 16 is connected to the first rail extension 48 (and thus the cab structure 14) with a first reinforcement block 60 that is insertable into a first aperture 62 in the core layer 18 of the structural bed 16. At least one fastener 64 such as bolt 64 (shown in FIGS. 1 and 5) extends through an opening 66 in the reinforcement block 60. The opening 66 is aligned with first and second outer openings 68, 70 in the first and second outer layer 20, 22, respectively, and a rail opening 72 in the first plate 54 of the first rail extension 48 such that there is overlap in at least a portion of all the openings 66, 68, 70 and 72. Referring to FIG. 5, a weld nut 76 is welded or otherwise attached to the first rail extension 48. The bolt 64 is passed through the first outer opening 68, block opening 66, second outer opening 70 and the rail opening 72, threaded into the weld nut 76 and tightened. Any suitable type and number of fasteners may be selected by one of ordinary skill in the art for the specific application. The first reinforcement block 60 may be composed of aluminum or other compressibly rigid material. The first reinforcement block 60 prevents the core layer 18 of the structural bed 16 from collapsing when the bolt 64 is tightened. The first and second outer layers 20, 22 may transfer their loads to the supporting rail extensions 48, 50 without loading the bolts in shear. As is known, bolts that are loaded in shear are loaded in a direction perpendicular to their axis, while bolts loaded in tension are loaded in a direction parallel to their axis. Another reinforcement block (not shown) may be used to connect the second rail extension 50 (and thus the cab structure 14) to the structural bed 16.

By employing a composite structural bed 16 composed of first and second outer layers 20, 22 over a core layer 18, the bed floor and separate frame rails on a traditional pickup-type structure are replaced. The composite structural bed 16 is integrated with a number of mass-efficient structures to produce an efficient load-bearing structure for the vehicle body 12. Referring to FIG. 3, spaced-apart first and second buttresses 80, 82 extend rearward from the cab structure 14 and are operatively connected to the structural bed 16 (the first buttress is also shown in FIG. 1). The buttresses 80, 82 may be hollow tubes chosen from a lightweight and load-bearing material. The buttresses serve 80, 82 to make the body 12 more rigid in bending, in other words, help stiffen the body 12 against bending deformation. As shown in FIG. 3, the buttresses 80, 82 may be attached to a first position 84 on the cab structure 14, where the structural side-frame 36 of the cab structure 14 intersects the rear glass header 86. Optionally, the buttresses 80, 82 may be attached to a position that is lower on the cab structure 14, for example, at second position 88 below the rear glass.

Optionally, referring to FIG. 1, the first buttress 80 may be attached to the structural bed 16 through a second reinforcement block 90 insertable in a second aperture 92 in the structural bed 16. The first buttress 80 may be operatively connected to a portion 91 of the first outer layer 20 approximately above the second reinforcement block 90. As illustrated in FIGS. 1 and 4, a mounting plate 94 is attached underneath the second outer layer 22 and aligned with the second reinforcement block 90 for mounting the first coil spring 114 and a first shock absorber 120 (described below). The second reinforcement block 90 prevents the structural bed 16 from collapsing or being crushed between the buttress 80 and the mounting plate 94. As illustrated in FIGS. 1 and 3, a fastener such as bolt 96 extends through aligned respective openings in the second reinforcement block 90 and first and second outer layers 20, 22. The second reinforcement block 90 may be formed of aluminum or other rigidly incompressible material. A similar reinforcement block may be used to attach the second buttress 82.

Referring to FIGS. 1, 3 and 4, the structural bed 16 is operatively connected to a rear axle 102. As shown in FIGS. 3 and 4, the rear axle 102 is operatively connected to the cab structure 14 through a triangulated set of first, second, third and fourth suspension links 104, 106, 108, 110 which serve to locate and stabilize the rear axle 102 (links 104, 108 are also shown in FIG. 1). The rear axle torque is resolved to the cab structure 14 via the suspension links 104, 106, 108, 110. In the embodiment shown in FIG. 3, the first and second suspension links 104, 106 connect the first and second rail extensions 48, 50 (and thus the cab structure 14) to approximately the center of the rear axle 102 while the third and fourth suspension links 108, 110 connect the floor pan 42 (and thus the cab structure 14) to approximately the ends of the rear axle 102. The points of attachment between the rear axle 102 and the cab structure 14 may be altered within the scope of the disclosure. For example, the first, second, third and fourth suspension links 104, 106, 108, 110 may connect the rear axle 102 to the rocker section 112 (shown in FIG. 3) or portion of the side-frame 36 running below the vehicle door.

Referring to FIGS. 1 and 3, the rear axle 102 is connected to the structural bed 16 through first and second coil springs 114, 116. When the vehicle 10 is traveling forward on a level surface and the wheels (not shown) strike a bump, the first and second coil springs 114, 116 are rapidly compressed. The coil springs 114, 116 will attempt to return to their normal length, thus applying a force upward on the structural bed 16 and downward on the rear axle 102. As illustrated in FIGS. 1 and 3, the first buttress 80 is aligned or positioned approximately above the first coil spring 114 and adapted to transmit a spring load of the first coil spring 114 to the cab structure 14. As illustrated in FIG. 3, the second buttress 82 is aligned or positioned approximately above the second coil spring 116 and adapted to transmit a spring load of the second coil spring 116 to the cab structure 14. At least a portion of each of the buttresses 80, 82 is angled to at least partially define a continuous load-bearing path for a spring load of the coil springs 114, 116, respectively. The incline angle of the buttresses 80, 82 may be optimized by one of ordinary skill in the art for the particular application.

To control the oscillation of the coil springs 114, 116, a dampening device such as a shock absorber may be used. FIGS. 3-4 illustrate first and second shock absorbers 120, 122, each of which operatively connects the rear axle 102 to the bed 16. As illustrated in FIG. 4, one end of the shock absorber 120 is mounted to the structural bed 16 (via the mounting plate 94) while the other end is attached to the rear axle 102. Suitable fasteners such as rubber bushings (not shown) may be used to fasten the shock absorbers 120, 122. In addition to the first and second coil spring loads, the shock loads are transmitted via the first and second buttresses 80, 82 (shown in FIG. 3) to the cab structure 14. Referring to FIG. 3, the rear view of the vehicle 10 shows the first and second shock absorbers 120, 122 being angled to allow load transfer to the first and second buttresses 80, 82.

Referring to FIGS. 1 and 5, a barrier 130, referred to herein as backstop 130, may be positioned between the cab structure 14 and the structural bed 16 and configured to prevent the structural bed 16 from colliding into the cab structure 14 during a forward load or rear impact event, indicated by arrow 32 and shown in FIGS. 1 and 4-5. The buttresses 80, 82 will tend to resist forward motion of the structural bed 16, but the fact that they are angled to resist vertical spring loads makes them less effective at managing horizontal impact loads. The backstop 130 may be used as an additional feature to help manage impact loads. The proportion of the impact loading that is taken by the first and second buttresses 80, 82 versus the backstop 130 may be optimized for each application. The backstop 130 extends upward sufficiently to allow the first and second outer layers 20, 22 to engage the backstop 130 if they translate forward in the vehicle 10 during the rear impact event indicated by arrow 32.

Referring to FIG. 5, the backstop 130 is rigidly attached to the first rail extension 48 (and thus cab structure) abutting the structural bed 16. A second backstop (not shown) similar to the backstop 130 may be attached to the second rail extension 48. As shown in FIG. 5, the backstop 130 includes a base panel 132 and side flanges 134 extending from the base panel (only one side flange 134 is shown in the cutaway view of FIG. 5). The side flanges 134 are folded over and attached to the first rail extension 48 via rivets 136 (shown in FIGS. 1 and 5). Welds, threaded fasteners or other attachment devices may be substituted for the rivets 136. The side flanges 134 allow the backstop 130 to have sufficient section in the horizontal plane to resist bending when subjected to the rear impact event indicated by arrow 32. Optionally, a first base portion 138 of the base panel may be inclined for packaging efficiency. A second base portion 140 of the base panel 132 may extend vertically upwards and touch or abut the first rail extension 48, as shown in FIG. 5.

The backstop 130 may be stamped out of a single piece of metal. The backstop 130 may be stamped, cast, fabricated, extruded, or otherwise configured such that it meets the basic requirement of providing a structural barrier to intrusion into the cab structure 14 by the structural bed 16. A back panel (not shown) may also be added to increase the stiffness of the backstop 130. One of ordinary skill in the art may optimize the shape and size of the backstop 130 based on specific load requirements. Referring to FIGS. 1 and 4-5, the vehicle 10 also includes a fuel tank 142 and drive shaft 144 placed below the structural bed 16.

While the best modes for carrying out the invention have been described in detail, those familiar with the art to which this invention relates will recognize various alternative designs and embodiments for practicing the invention within the scope of the appended claims.

The invention claimed is:

1. A vehicle having a cab structure, the vehicle comprising:
   a structural bed extending rearward from the cab structure and configured as a structural load-bearing member;
   wherein the structural bed includes:
      a core layer;
      first and second outer layers flanking the core layer and spanning substantially the entirety of the core layer;
   wherein the first and second outer layers are composed of a material that has a higher strength than the core layer;
   a first buttress extending rearward from the cab structure and operatively connected to the structural bed;
   a first coil spring operatively connected to the structural bed; and
   wherein the first buttress is aligned at least partially with the first coil spring and configured to transmit a spring load of the first coil spring to the cab structure.

2. The vehicle of claim 1, further comprising grooves formed in the core layer, the grooves being configured to allow the core layer to crush in a predetermined manner upon a rear impact event.

3. The vehicle of claim 1, wherein the core layer is comprised of a foam material; and wherein the first and second outer layers are composed of metal.

4. The vehicle of claim 1, wherein the core layer has a thickness of at least approximately 100 mm; and wherein the first and second outer layers each have a thickness at least approximately 1 mm.

5. The vehicle of claim 1, further comprising:
   a barrier positioned between the cab structure and the structural bed, the barrier being configured to bear rear impact loads; and
   wherein the barrier includes a base panel and at least one side flange extending from and folded relative to the base panel.

6. The vehicle of claim 1, further comprising:
   a reinforcement block insertable into an aperture in the core layer of the structural bed;
   wherein the first buttress is operatively connected to a portion of the first outer layer approximately above the reinforcement block; and
   a fastener extending through respective openings in the reinforcement block and first and second outer layers of the structural bed, thereby connecting the first buttress to the structural bed.

7. The vehicle of claim 1, further comprising:
   a rear axle operatively connected to the structural bed;
   first, second, third and fourth suspension links, each of which operatively connects the rear axle to the cab structure; and
   first and second shock absorbers, each of which operatively connects the rear axle to the structural bed.

8. The vehicle of claim 1, in combination with the cab structure, further comprising:
   spaced longitudinally-extending first and second underbody rails extending at least partially along the cab structure; and
   first and second rail extensions operatively connecting the structural bed to the respective first and second underbody rails.

9. The vehicle of claim 8, further comprising:
   a reinforcement block insertable into a aperture in the core layer of the structural bed;
   wherein the first rail extension is operatively connected to a portion of the second outer layer approximately below the reinforcement block; and a fastener extending through respective openings in the first reinforcement block, first rail extension and first and second outer layers of the structural bed, thereby connecting the structural bed to the first rail extension.

10. The vehicle of claim 8, wherein the first rail extension includes:
spaced-apart first and second plates extending substantially parallel to a forward travel direction of the vehicle; and
opposing side walls connecting the first and second plates.

11. A vehicle comprising:
a cab structure having spaced-apart longitudinally-extending first and second underbody rails;
a structural bed extending rearward from the cab structure; wherein the structural bed includes:
a core layer; and
first and second outer layers flanking the core layer and spanning substantially the entirety of the core layer;
wherein said core layer has a thickness of at least approximately 10 times each of the first and second outer layers;
spaced-apart first and second rail extensions operatively connecting the structural bed to the respective first and second underbody rails; and
grooves formed in the core layer, the grooves being configured to allow the core layer to crush in a predetermined manner upon a rear impact event.

12. The vehicle of claim 11, wherein each of the first and second outer layers are formed of a material having strength and stiffness at least approximately 10 times that of the core layer.

13. The vehicle of claim 11, further comprising:
a first buttress extending rearward from the cab structure and operatively connected to the structural bed;
a first coil spring operatively connected to the structural bed; and
wherein the first buttress is aligned with the first coil spring and configured to transmit a spring load of the first coil spring to the cab structure.

14. The vehicle of claim 11, further comprising:
a barrier positioned between the cab structure and the structural bed, the barrier being operatively connected to the rail extension;
wherein the barrier extends upward sufficiently to align with the first and second outer layers of the structural bed; and
wherein the barrier is configured to at least partially absorb rear loads applied to the structural bed.

15. A vehicle comprising:
a cab structure having spaced-apart longitudinally-extending first and second underbody rails;
a structural bed extending rearward from the cab structure;
wherein the structural bed includes a core layer; and first and second outer layers flanking the core layer and spanning substantially the entirety of the core layer;
wherein said core layer has a thickness of at least approximately 10 times each of the first and second outer layers;
spaced-apart first and second rail extensions operatively connecting the structural bed to the respective first and second underbody rails;
spaced-apart first and second buttresses extending rearward from the cab structure and operatively connected to the structural bed;
a reinforcement block insertable into an aperture in the core layer of the structural bed, the reinforcement block having a block opening for receiving a fastener; and
a fastener extending through the block opening in the reinforcement block and aligned respective openings in the first rail extension and first and second outer layers of the structural bed, thereby connecting the structural bed to the first rail extension.

16. The vehicle of claim 15, wherein:
the core layer has a strength approximately between 10 and 20 Mpa and a stiffness approximately between 0.5 and 1.0 Gpa; and
the first and second outer layers have a strength approximately between 275 and 375 Mpa and a stiffness approximately between 100 and 200 Gpa.

17. The vehicle of claim 15, wherein:
the core layer has a strength approximately between 10 and 20 Mpa and a stiffness approximately between 0.5 and 1.0 Gpa; and
the first and second outer layers have a strength approximately between 1500 and 2500 Mpa and a stiffness approximately between 50 and 150 Gpa.

* * * * *